US008196308B1

(12) United States Patent
Baldi, Jr.

(10) Patent No.: US 8,196,308 B1
(45) Date of Patent: Jun. 12, 2012

(54) MARKING APPARATUS FOR MEASURING TAPE UNIT

(76) Inventor: Louis Baldi, Jr., Pine Bush, NY (US)

( * ) Notice: Subject to any disclaimer, the term of this patent is extended or adjusted under 35 U.S.C. 154(b) by 0 days.

(21) Appl. No.: 12/874,750

(22) Filed: Sep. 2, 2010

Related U.S. Application Data

(60) Provisional application No. 61/239,233, filed on Sep. 2, 2009.

(51) Int. Cl.
*G01B 3/10* (2006.01)
(52) U.S. Cl. .................. 33/668; 33/768; 33/770
(58) Field of Classification Search .......... 33/668, 33/760, 761, 767, 768
See application file for complete search history.

(56) References Cited

U.S. PATENT DOCUMENTS

| | | | | | |
|---|---|---|---|---|---|
| 4,439,927 | A | * | 4/1984 | Elliott | 33/668 |
| 4,630,376 | A | * | 12/1986 | Pentecost | 33/760 |
| 4,760,648 | A | * | 8/1988 | Doak et al. | 33/668 |
| 4,965,941 | A | * | 10/1990 | Agostinacci | 33/668 |
| 5,416,978 | A | * | 5/1995 | Kaufman | 33/770 |
| 5,435,074 | A | * | 7/1995 | Holevas et al. | 33/668 |
| 5,477,619 | A | * | 12/1995 | Kearns | 33/668 |
| 5,577,329 | A | * | 11/1996 | States | 33/768 |
| 5,992,038 | A | * | 11/1999 | Harmon et al. | 33/768 |
| 6,178,655 | B1 | * | 1/2001 | Potter et al. | 33/668 |
| 6,434,854 | B1 | * | 8/2002 | MacColl et al. | 33/668 |
| 6,513,261 | B2 | * | 2/2003 | Johnson | 33/668 |
| 6,574,881 | B2 | * | 6/2003 | Cole, III | 33/668 |
| 6,612,046 | B1 | * | 9/2003 | Cimorell et al. | 33/668 |
| 6,725,560 | B2 | * | 4/2004 | Smith | 33/668 |
| 6,880,260 | B2 | * | 4/2005 | Baida | 33/668 |
| 6,892,469 | B2 | * | 5/2005 | Tufts et al. | 33/768 |
| 6,938,354 | B2 | * | 9/2005 | Worthington | 33/668 |
| 6,941,672 | B2 | * | 9/2005 | Scarborough | 33/761 |
| 7,040,035 | B1 | * | 5/2006 | Scarborough | 33/668 |
| 7,086,174 | B2 | * | 8/2006 | Scarborough | 33/761 |
| 7,269,913 | B2 | | 9/2007 | Holevas | |
| 7,500,322 | B2 | * | 3/2009 | Brown | 33/668 |
| 2001/0034953 | A1 | * | 11/2001 | Cole, III | 33/668 |
| 2003/0154615 | A1 | * | 8/2003 | Worthington | 33/668 |
| 2005/0178019 | A1 | * | 8/2005 | Scarborough | 33/668 |
| 2006/0112582 | A1 | * | 6/2006 | Scarborough | 33/668 |
| 2006/0218810 | A1 | * | 10/2006 | Holevas | 33/668 |
| 2011/0239479 | A1 | * | 10/2011 | Chisholm et al. | 33/770 |

\* cited by examiner

*Primary Examiner* — Yaritza Guadalupe-McCall
(74) *Attorney, Agent, or Firm* — L.C. Begin & Associates, PLLC

(57) ABSTRACT

A marking apparatus for a measuring tape unit, the marking apparatus includes at least one marking member configured for marking a surface.

11 Claims, 3 Drawing Sheets

MARKING APPARATUS FOR MEASURING TAPE UNIT

CROSS REFERENCE TO RELATED APPLICATION

This application claims the benefit of U.S. Provisional Application No. 61/239,233 filed on Sep. 2, 2009, the disclosure of which is incorporated by reference.

FIELD OF THE DISCLOSURE

The present disclosure generally relates to marking apparatuses, and, more specifically, to a marking apparatus for a measuring tape unit.

BACKGROUND OF THE DISCLOSURE

Various types of tape measures are available for the purpose of measuring a surface, such as a wooden surface. Typically, a user tends to measure a given surface with the help of a tape measure and mark the surface as per the measurement with the help of a tool such as a pencil, a pen, a marker or the like. The user may utilize both hands in order to hold the tape measure for taking a correct measurement of the surface. However, the user may not be able to mark the surface with exact precision while his/her hands are engaged in holding the tape measure. Accordingly, the user may need to utilize services of another person for marking the surface as measured by the tape measure. Further, incorrect measurements may be taken when an attempt is made by a single individual to measure the surface and simultaneously mark the surface.

SUMMARY OF THE INVENTION

In one aspect of the embodiments of the present invention, a marking apparatus for a measuring tape unit is provided. The marking apparatus includes at least one marking member configured for marking a surface.

In another aspect of the embodiments of the present invention, a measuring tape unit for measuring and marking a surface is provided. The measuring tape unit includes a housing configured to retain a measuring tape therewithin. The measuring tape is adapted to extend from within the housing for measuring the at least a portion of a surface. The measuring tape unit also includes a marking apparatus having at least one marking member configured to be operatively coupled to the housing. The at least one marking member includes a lip portion adapted to be pressed to enable a user to mark the surface being measured by the measuring tape, and a supporting element extending from the lip portion towards the surface to be marked. The supporting element includes a projection for marking the surface.

BRIEF DESCRIPTION OF THE DRAWINGS

The advantages and features of the present disclosure will become better understood with reference to the following detailed description and claims taken in conjunction with the accompanying drawings, in which:

Like reference numerals refer to like parts throughout the description of the drawings.

DETAILED DESCRIPTION OF THE DISCLOSURE

The exemplary embodiments described herein detail for illustrative purposes are subject to many variations in structure and design. It should be emphasized, however, that the present disclosure is not limited to a particular marking apparatus for a measuring tape unit, as shown and described. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "a" and "an" herein do not denote a limitation of quantity, but rather denote the presence of at least one of the referenced item. The use of terms "including," "comprising," or "having" and variations thereof herein is meant to encompass the items listed thereafter and equivalents thereof as well as additional items.

The embodiments of the present invention provide a marking apparatus for a measuring tape unit. The marking apparatus is adapted to be mounted on the measuring tape unit for enabling a user to mark a surface while the user measures the surface. Specifically, the marking apparatus may enable the user to measure and mark the surface simultaneously. The marking apparatus is explained in conjunction with FIGS. 1-3.

Figure 1:
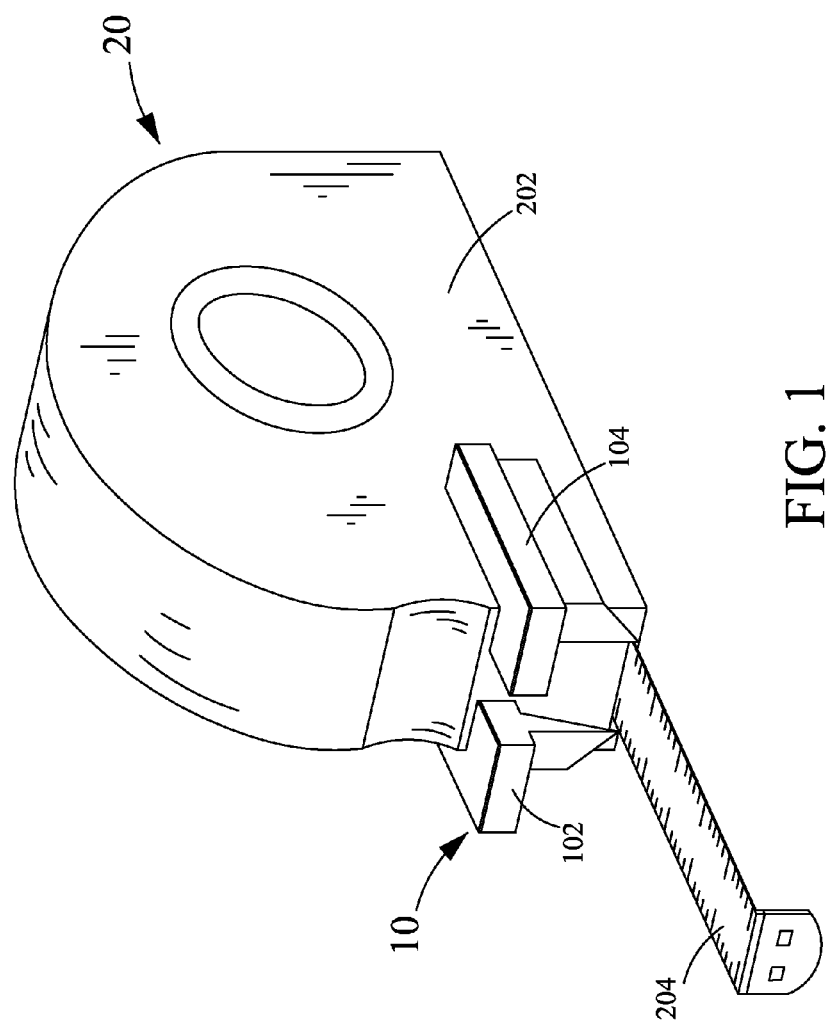
FIG. 1 is a perspective view of a measuring tape unit employing a marking apparatus.

Referring to FIG. 1, one embodiment of a marking apparatus 10 may include at least one marking member, such as a marking member 102 and a marking member 104. The marking members 102, 104 may be adapted to be coupled to a measuring tape unit 20. In a particular embodiment, the marking members 102, 104 are adapted to be coupled to a housing 202 of the measuring tape unit 20. It should be understood that the marking members 102, 104 may be configured to have shapes to facilitate attachment thereof to the housing 202 of the measuring tape unit 20. For the purpose of this description, the marking members 102, 104 may be configured to have a T-shape. Alternatively, the marking members 102, 104 may be configured to have any other polygonal shape to structurally conform to the housing 202 of the measuring tape unit 20. Further, the marking members 102, 104 may be made of a material having structural integrity sufficient for the purposes described herein. Suitable examples of such a material include, but are not limited to, a metallic material, aplastic material, a rubber material, and a combination thereof.

Figure 3:
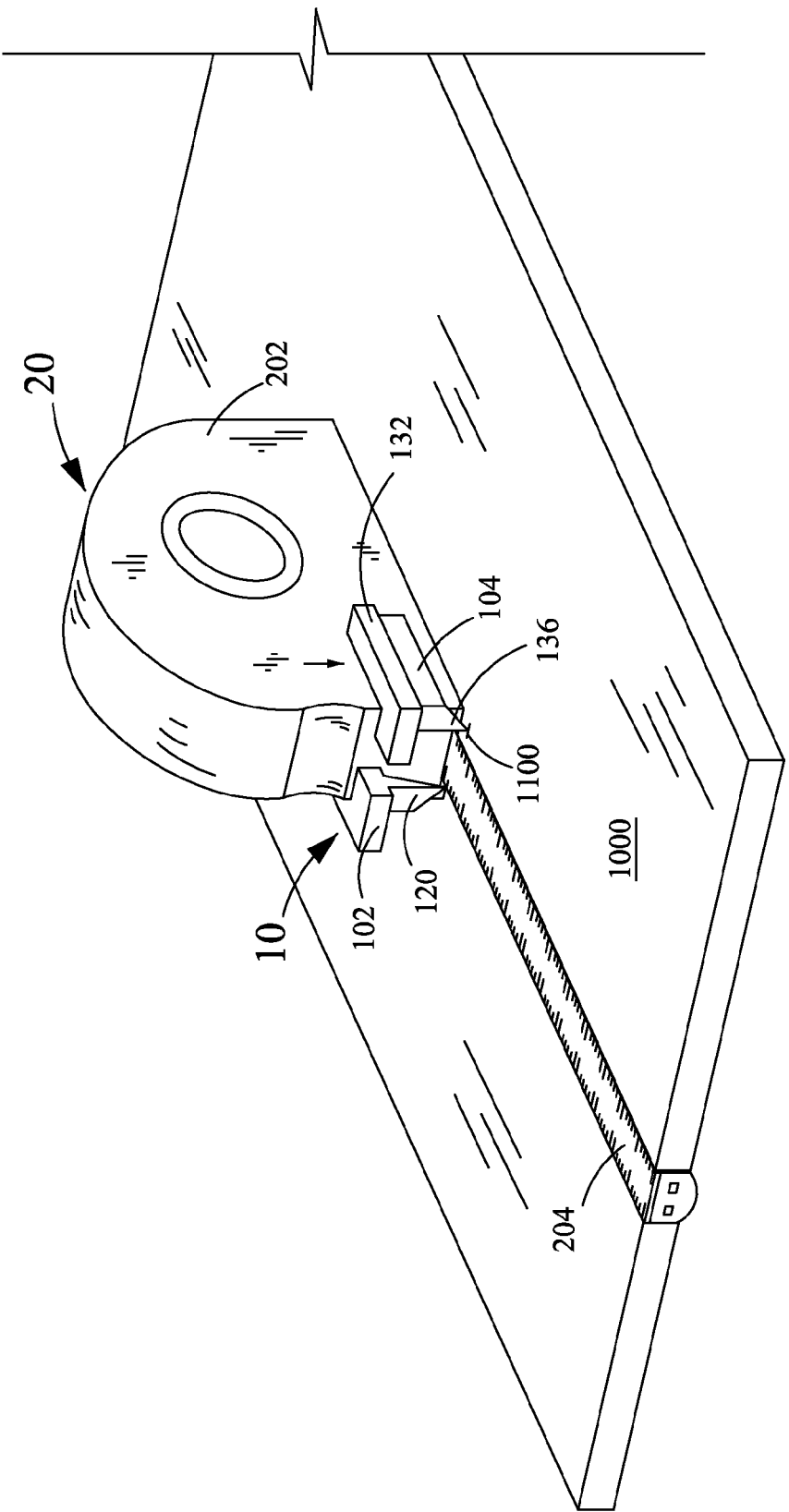
FIG. 3 is a perspective view depicting the utilization of the marking apparatus of FIG. 1 for marking a surface.

The marking members 102, 104 may be configured to mark a surface 1000 to be measured by a measuring tape 204 of the measuring tape unit 20 (as shown in FIG. 3). The measuring tape 204 is adapted to extend from within the housing 202 of the measuring tape unit 20 when the surface 1000 needs to be measured prior to be marked by the marking members 102, 104.

Figure 2:
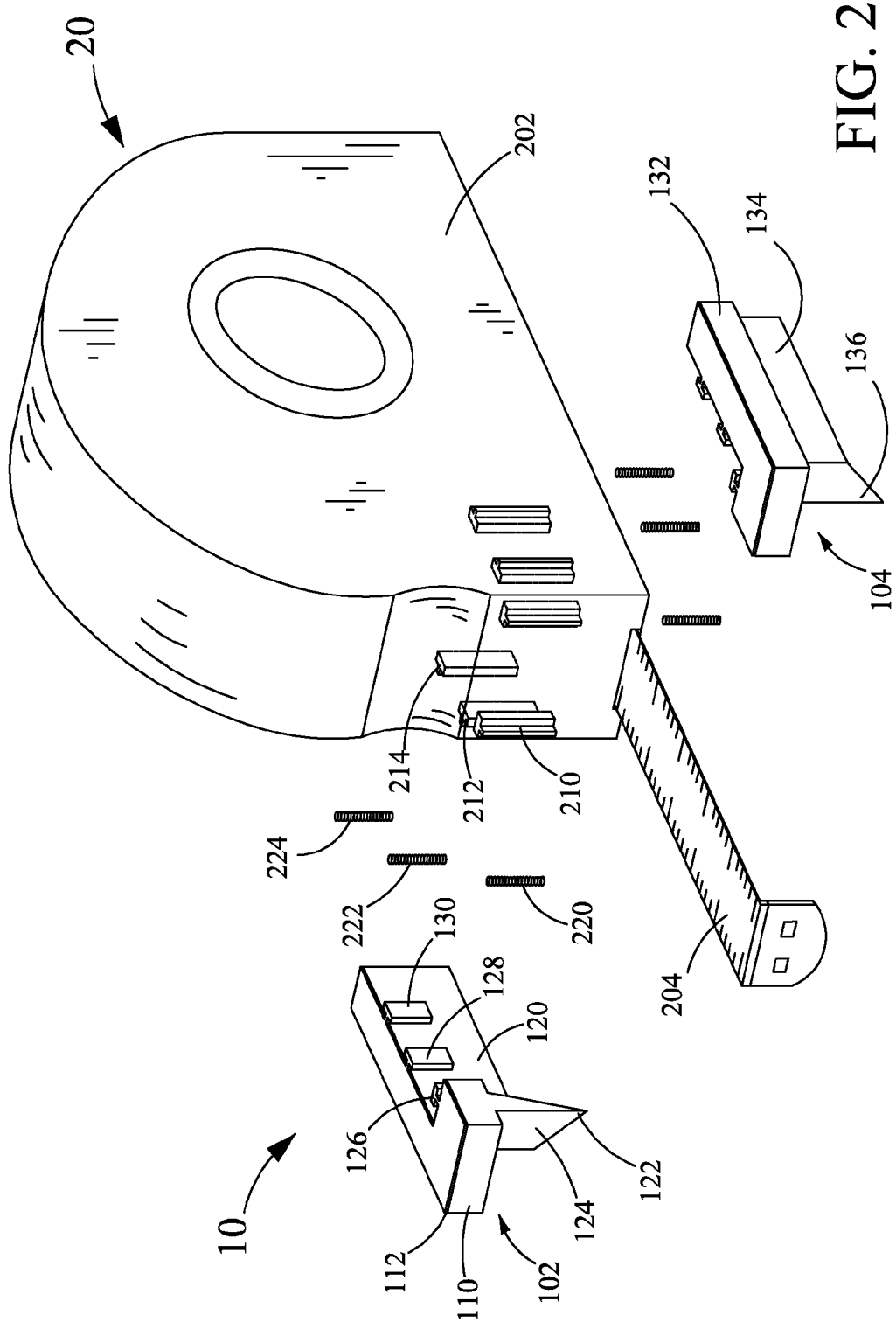
FIG. 2 is an unassembled perspective view of the marking apparatus for the measuring tape unit of FIG. 1.

The marking member 102 may include a lip portion 110 (as shown in FIG. 2). The lip portion 110 may be adapted to be pressed by either a thumb or a finger (not shown) of a user to enable the user to mark the surface 1000. The lip portion 110 may be an L-shaped portion that is sufficiently large enough to allow the user to easily press the lip portion 110. However, the lip portion 110 may be configured to have any other shape that facilitates pressing of the lip portion 110. The lip portion 110 may be include a rubber pad 112 disposed thereon to facilitate pressing of the lip portion 110. The rubber pad 112 may be attached to the lip portion 110 by a means such as an adhesive, a nut and bolt arrangement or the like.

The marking member 102 may further include a supporting element 120 extending vertically downwards from the lip portion 110 and towards the surface 1000 to be marked and measured (as shown in FIGS. 2 and 3). The supporting element 120 may be formed as an integral part of the lip portion 110. Alternatively, the supporting element 120 may be attached with the lip portion 110 by a means such as welding, an adhesive, screws, or other methods. The supporting element 120 may be configured to have a suitable shape, such as a rectangular shape, an L-shape, or another suitable shape in order to conform to the general shape of the lip portion 110. Further, the supporting element 120 may be made of a material having structural integrity sufficient to withstand and support a pressure exerted by the user on the lip portion 110. Suitable examples of a material that may be used for making the supporting element 120 may include, but are not limited to, a metallic material, a plastic material and a rubber material.

Further, the supporting element 120 may include a pointed projection 122 on a front portion 124 of the supporting element 120, as shown in FIG. 2. Specifically, the pointed projection 122 is adapted to mark the surface 1000 while the user presses the lip portion 110 using either the thumb or the finger (not shown). Specifically, the pointed projection 122 may act as a scriber that may be used for making a mark 1100 (as shown in FIG. 3) on the surface 1000 when the user measures the surface 1000 with the help of the measuring tape 204. As shown in FIG. 2, the pointed projection 122 may be formed as an integral part of the supporting element 120. The pointed projection 122 may be made of a suitable material having properties (such as sufficient hardness, for example) suitable for making the mark 1100 on the surface 1000.

The supporting element 120 may also include at least one protruding tab such as protruding tabs 126, 128 and 130 extending from a surface (not numbered) of the supporting element 120. As shown in FIG. 2, the protruding tabs 126, 128 and 130 may be T-shaped tabs. It is to be understood that the shape of the protruding tabs 126, 128 and 130 should not be considered as a limitation to the present disclosure. The protruding tabs 126, 128 and 130 may be formed as an integral part of the supporting element 120. Alternatively, the protruding tabs 126, 128, and 130 may be attached, by a means such as welding, to the supporting element 120 at the time of manufacturing the marking member 102.

The protruding tabs 126, 128 and 130 may be adapted to be slidably received in channels 210, 212 and 214, respectively. The channels 210, 212 and 214 may be configured on the housing 202 of the measuring tape unit 20. The protruding tabs 126, 128 and 130 may have a structural conformity with the respective channels 210, 212 and 214 so as to be easily received by the channels 210, 212, and 214. As shown in FIG. 2, the channels 210, 212 and 214 may be configured to have a T-shape. It is to be understood that the shape of the channels 210, 212 and 214 should not be considered as a limitation to the present disclosure.

Each of the channels 210, 212 and 214 may include a spring member. Specifically, the channels 210, 212 and 214 include spring members 220, 222 and 224, respectively. The spring members 220, 222 and 224 may be positioned at respective bottom portions (not numbered) of the channels 210, 212 and 214. The spring members 222 and 224 are structurally and functionally similar to the spring member 220, therefore the description of the spring members 222 and 224 is avoided for the sake of brevity.

The spring member 220 is operatively coupled to the protruding tab 126 to enable marking member 102 to slide resiliently within the channel 210 towards the surface 1000. Specifically, when the user presses down on the lip portion 110 to bring the pointed projection 122 in contact with the surface 1000, the associated tab 126 is forced downward, thereby compressing the spring member 220. A user may retain the marking member 102 in a first fixed position over the surface 1000 by continuing to apply downward pressure on lip portion 110. Further, the spring member 220 may undergo expansion when the user releases the lip portion 110 after marking the surface 1000, in order to bring the marking member 102 away from the surface 1000 and in a second fixed position. The spring member 220 may be made of a suitable material, such as a metallic material, an alloy or the like and may have any suitable configuration (for example, a coil spring or leaf spring).

Similarly, the marking member 104 may include a lip portion 132, a supporting element 134 and a pointed projection 136, as shown in FIG. 2 and FIG. 3. The marking member 104 is structurally and functionally similar to the marking member 102, therefore the description of the marking member 104 is avoided for the sake of brevity.

In use, the user may hold the measuring tape unit 20 in a first hand thereof and may extend and fix the measuring tape 204 from the measuring tape unit 20 onto the surface 1000 using a second hand. Thereafter, the user may press the lip portion 110 of the marking member 102 and/or the lip portion 132 of the marking member 104 towards the surface 1000 with the first hand, such that the pointed projection 122 of the supporting element 120 and/or the pointed projection 136 of the supporting element 134 of the marking member 104 touch the surface 1000 to be marked. Further, by slight sideways movement of the measuring tape unit 20 while keeping the pointed projection 122 and/or the pointed projection 136 intact with the surface 1000, a mark such as the mark 1100 is drawn on the surface 1000 without any difficulty. Accordingly, the user need not require any marking tool such as a pencil, a pen and any other instrument for marking the surface 1000 while taking a measurement on the surface 1000.

In another aspect, the present disclosure provides a measuring tape unit, such as the measuring tape unit 20. The measuring tape unit may include a housing, such as the housing 202. The housing is configured to receive a measuring tape, such as the measuring tape 204, therewithin. Further, the measuring tape may be adapted to extend from within the housing for measuring a surface, such as a surface 1000. The measuring tape may include markings with reference to inches and centimeters scale.

The measuring tape unit may also include a marking apparatus, such as the marking apparatus 10. The measuring tape unit employing the marking apparatus is structurally and functionally similar to the marking tape unit 20 that employs the marking apparatus 10 as described in conjunction with FIGS. 1-3, therefore the description of the measuring tape unit and the marking apparatus is avoided for the sake of brevity.

Based on the forgoing description, a marking apparatus, such as the marking apparatus 10 for a measuring tape unit, such as the measuring tape unit 20, may enable a user to mark a surface while measuring the surface. The user does not require any additional marking tool such as a pencil, a pen and the like, for marking the surface while simultaneously taking a measurement on the surface. Additionally, the marking apparatus of the embodiments of the present invention may be made of different sizes to be used with various types, sizes and brands of measuring tapes. Further, the present disclosure provides a measuring tape unit that employs the marking apparatus. The measuring tape unit may easily be held by a user who intends to measure a surface and simultaneously mark the surface with the help of the marking apparatus without the need for any additional marking tools or services of another person either for marking the surface or for holding the measuring tape unit.

In particular embodiments, channels such as channels 210, 212 and 214 and associated spring members such as spring members 220, 222 and 224 are incorporated into one or more associated base units (not shown) mountable to the housing 202 of the measuring tape unit 20. Either (or both) of marking members 102, 104 may then be operatively coupled (via tabs such as 126, 128 and 130) to an associated base unit to permit actuation of the marking members to mark a measured object, as previously described. A single base unit may include sufficient channels and spring members for only one of marking members 102, 104. Alternatively, a single base unit may include sufficient channels and spring members to enable both of marking members 102, 104 to be operatively coupled thereto. The structure just described enables the marking apparatus to be provided separately from the measuring tape unit and retrofit to the measuring tape unit.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, and thereby enable others skilled in the art to best utilize the disclosure and various embodiments with various modifications as are suited to the particular use contemplated. It is understood that various omissions and substitutions of equivalents are contemplated as circumstances may suggest or render expedient, but such are intended to cover the application or implementation without departing from the spirit or scope of the claims of the present disclosure.

What is claimed is:

1. A marking apparatus for a measuring tape unit, the marking apparatus comprising at least one marking member configured for marking a surface, the marking member including at least one lip portion structured to be pressable by a finger of a user to mark a surface, the lip portion being structured to extend along a first side of a housing of the measuring tape unit and also along a second side of the housing adjacent the first side, wherein the lip portion is structured to enable a user to mark a surface being measured by a measuring tape extendible from within the housing of the measuring tape unit for measuring at least a portion of the surface; and wherein the at least one marking member further includes a supporting element extending from the lip portion towards the surface to be marked, the supporting element including a projection adapted to mark the surface, and wherein the supporting element further comprises at least one protruding tab extending from a surface thereof, each protruding tab of the at least one protruding tab adapted to be slidably received in an associated channel coupled to the housing of the measuring tape unit.

2. The marking apparatus of claim 1, wherein the channel includes a spring member positioned therein and configured to engage the at least one protruding tab for exerting a force on the at least one protruding tab.

3. The marking apparatus of claim 1, wherein the each protruding tab of the at least one protruding tab is configured as a T-shaped tab.

4. The marking apparatus of claim 1 wherein the channel is configured to have a T-shape.

5. The marking apparatus of claim 1, wherein the lip portion is an L-shaped portion.

6. A measuring tape unit comprising:
a housing configured to retain a measuring tape therewithin, the measuring tape adapted to extend from within the housing for measuring at least a portion of a surface; and
a marking apparatus comprising at least one marking member configured to be operatively coupled to the housing, the at least one marking member including:
a lip portion extending along multiple sides of the housing and adapted to be pressed to enable a user to mark the surface being measured by the measuring tape, and
a supporting element extending from the lip portion towards the surface to be marked, the supporting element including a projection for marking the surface, and wherein the supporting element further comprises at least one tab extending from a surface thereof, and adapted to be slidably received in an associated channel positioned on the housing.

7. The measuring tape unit of claim 6, wherein the channel includes a spring member positioned therein and configured to engage the at least one tab in order exert a force on the tab within the channel.

8. The measuring tape unit of claim 6, wherein the at least one tab is configured as a T-shaped tab.

9. The measuring tape unit of claim 6, wherein the channel is configured to have a T-shape.

10. The measuring tape unit of claim 6, wherein the lip portion is an L-shaped portion.

11. The marking apparatus of claim 6 wherein the supporting element has a shape, and wherein the shape of the supporting element conforms to a general shape of the lip portion.

* * * * *